United States Patent [19]

Barbeau

[11] 4,311,431

[45] Jan. 19, 1982

[54] TURBINE ENGINE WITH SHROUD COOLING MEANS

[75] Inventor: Dennis E. Barbeau, Liberty Center, Ohio

[73] Assignee: Teledyne Industries, Inc., Los Angeles, Calif.

[21] Appl. No.: 958,545

[22] Filed: Nov. 8, 1978

[51] Int. Cl.³ .............................. F02C 7/12; F02C 7/28
[52] U.S. Cl. ................................... 415/172 A; 415/116
[58] Field of Search .................. 415/172 A, 116, 115, 415/117

[56] References Cited

U.S. PATENT DOCUMENTS 3,034,298  5/1962  White ................................. 415/116
3,703,808  11/1972 Stearns ........................... 415/172 A
4,161,318  7/1979  Stuart et al. .................... 415/172 A Primary Examiner—Louis J. Casaregola
Attorney, Agent, or Firm—Gifford, VanOphem, Sheridan & Sprinkle

[57] ABSTRACT

A turbine engine construction of the type having a support housing, a compressor and at least one turbine stage rotatably mounted in the support housing, said turbine stage having an annular rotating shroud secured around its outer periphery while a static shroud is connected to the support housing coaxially around and spaced radially outwardly from the rotating shroud thus defining a clearance space between the two shrouds. The novelty of the invention resides in a system for cooling both the static and rotating shrouds and for also simultaneously substantially reducing or eliminating the leakage of hot gases through the clearance space between the shrouds. In the preferred form of the invention, this system comprises a plurality of circumferentially spaced ports formed through the housing and/or static shroud. Each port has one end open to the compressed air outlet from the compressor and its other end open to the clearance space between the shrouds. The ports are of a number and dimension sufficient to create a cold air barrier in the clearance space.

5 Claims, 4 Drawing Figures

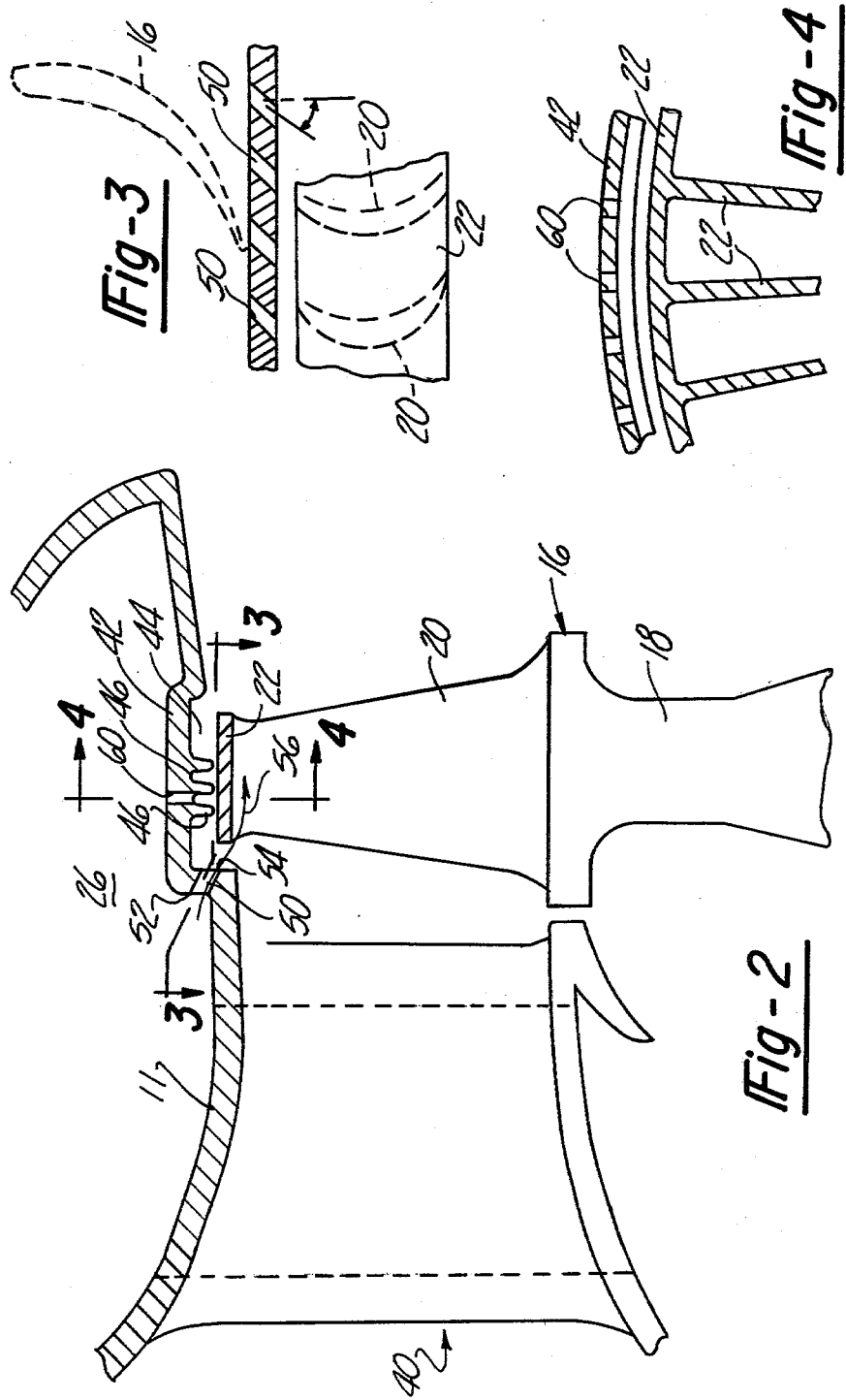

TURBINE ENGINE WITH SHROUD COOLING MEANS

BACKGROUND OF THE INVENTION

I. Field of the Invention

The present invention relates generally to turbine engine constructions and, more particularly, to a turbine engine construction with means for cooling the turbine shrouds and also to minimize hot air leakage around the first turbine stage.

II. Description of the Prior Art

Turbine engines typically comprise a support housing having a compressor and one or more turbine stages secured to a turbine shaft rotatably mounted in the support housing. The turbine compressor supplies compressed air to a combustor into which fuel is also injected and ignited. The hot and expanding gases resulting from combustion in the combustor exhausts through a turbine nozzle and through the turbine stage or stages to rotatably drive both the turbine stages and the turbine compressor via the turbine shaft.

In one type of previously known turbine engine construction, an annular rotating shroud is attached to the outer periphery of the turbine blades forming the first turbine stage while a cooperating static shroud is attached to or formed as a part of the support housing coaxially around and spaced radially outwardly from the rotating shroud. One or more labyrinth seals are oftentimes positioned between the static and rotating shrouds to reduce the leakage of hot gases through the shroud clearance space but such seals are only capable of reducing, not eliminating, such leakage. The leakage of hot gases through the shroud clearance space results in both a pressure energy loss and thermal energy loss since no useful work is performed by the leakage air flow.

A number of previously known turbine engine constructions also employ cooling means for cooling the outer or static shroud in order to minimize its thermal expansion during operation of the turbine engine. For example, it is well known to divert a portion of the relatively cool air from the compressor outlet across the radial outer surface of the static shroud. While reduction of the thermal expansion of the static shroud improves the overall efficiency of the turbine engine by reducing the shroud clearance space, some leakage still occurs.

These previously known turbine engines with static shroud cooling means, however, are ineffective in cooling the rotating shroud on the turbine rotor so that the rotating shroud rapidly attains the gas temperature of the turbine exhaust gases. The stress rupture life of the rotating shroud thus limits the inlet temperature into the turbine stages and, hence, the overall turbine engine efficiency.

SUMMARY OF THE PRESENT INVENTION

The present invention overcomes the above mentioned disadvantages of the previously known turbine engine constructions by providing a turbine engine construction with shroud cooling means for both the static and rotating shrouds and which also simultaneously eliminates the leakage of hot gases through the shroud clearance space.

In brief, the present invention provides a plurality of circumferentially spaced ports, each port having one end open to the relatively cool compressed air outlet from the turbine compressor and its other end open to the clearance space between the rotating and static shrouds. In one form of the invention, the ports extend substantially axially so that compressed air impinges upon the upstream end of the clearance space and shrouds while, in a modified form of the invention, the ports are formed radially through the static shroud.

The ports between the compressor outlet and the shroud clearance space are dimensioned to provide a compressed air flow sufficient to fill and create a cold air barrier in the clearance space. The cold air barrier not only cools both the static and the rotating turbine shroud, thereby increasing the stress rupture life of the rotor and/or increasing the turbine operating temperature, but also effectively prevents the leakage of hot gases through the shroud clearance space. Thus, while the pressure energy loss to the turbine engine remains the same, the present invention effectively eliminates the previously known thermal energy loss caused by the leakage of hot gases through the clearance space.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a fragmentary sectional view showing the shroud cooling means of the present invention and enlarged for clarity;

FIG. 3 is a fragmentary sectional view taken substantially along line 3—3 in FIG. 2 and enlarged for clarity; and FIG. 4 is a fragmentary sectional view taken substantially along line 4—4 in FIG. 2.

DETAILED DESCRIPTION OF THE PRESENT INVENTION

Figure 1:
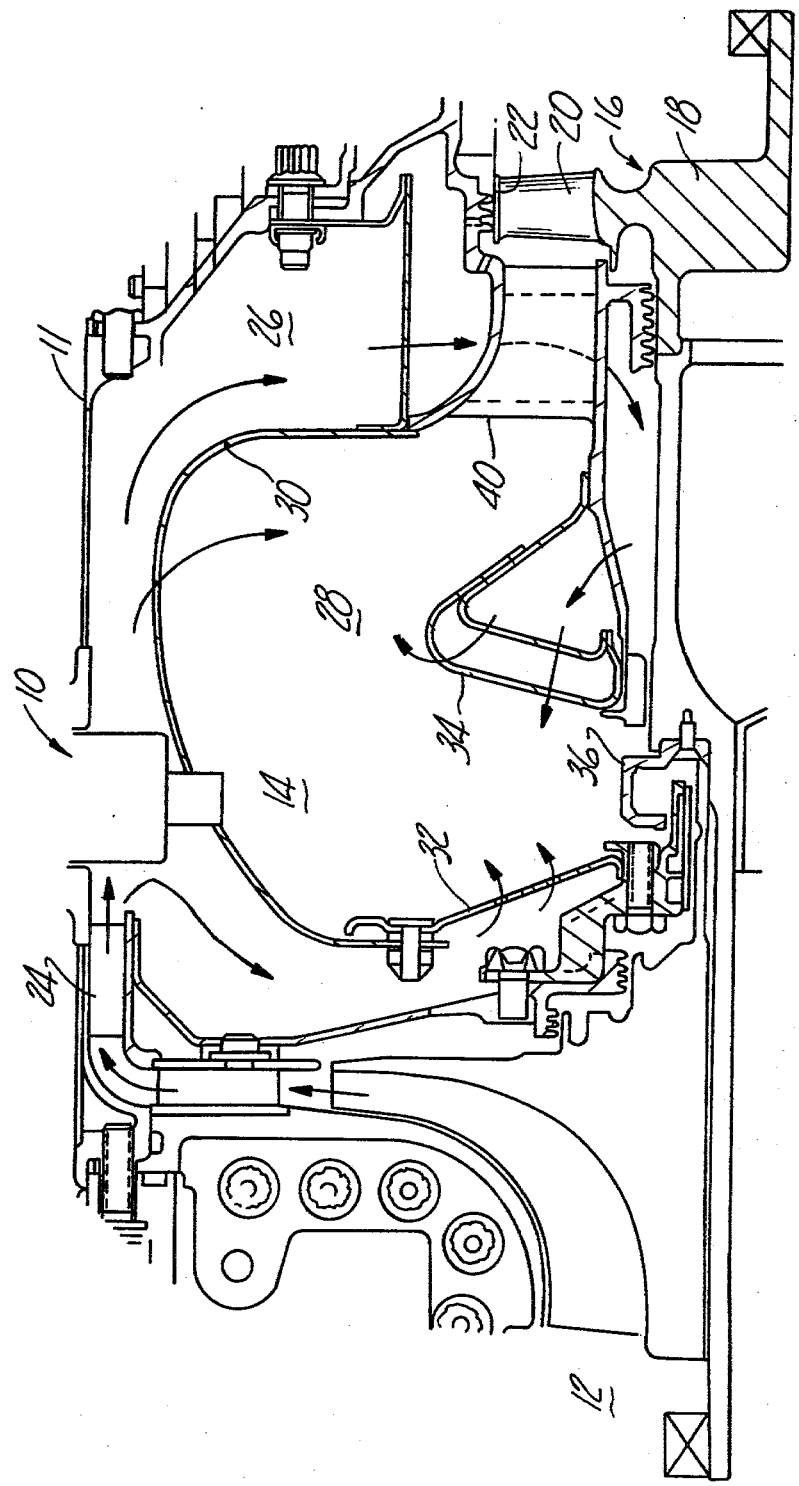
FIG. 1 is a fragmentary sectional view illustrating the turbine engine construction according to the present invention.

With reference first to FIG. 1, a turbine engine 10 is thereshown and comprises a support housing 11, a compressor 12, a combustor 14 and a turbine expander having one or more turbine stages 16 (only the first of which is shown). The turbine stage 16 includes a turbine hub 18 secured to a turbine shaft (not shown) and a plurality of circumferentially spaced turbine blades 20 extending radially outwardly from the hub 18. An integral shroud 22 is secured annularly around the outer tips of the turbine blade 20 for rotation in unison therewith.

In the conventional fashion the compressor 12 supplies compressed air via a diffuser assembly 24 to a compressed air outlet chamber 26 formed in the support housing 11. The compressed air from the chamber 26 then enters a combustion chamber 28 defined by a combustor housing 30 through a swirl plate 32 and inner combustor liner 34. Fuel is introduced into the combustion chamber 28 through a slinger 36 and ignited. The hot and expanding gases resulting from combustion of the fuel exhaust past a turbine nozzle 40 to the turbine stage or stages 16 to rotatably drive the same. Rotation of the turbine stage 16 in turn rotatably drives the compressor 12 via the turbine shaft in the conventional fashion. The turbine engine 10 thus far described is of a conventional construction so that detailed description of the aforementioned individual components is unnecessary and will be omitted for the sake of brevity.

With reference now to FIGS. 1 and 2, a static shroud 42 is secured to or formed in the support housing 11 so that the static shroud 42 extends coaxially around the rotating shroud 22. The static shroud 42, however, is spaced radially outwardly from the rotating shroud 22 to prevent rubbing between the shrouds and thus forms a clearance space 44 between the shrouds 22 and 42.

It is the leakage of hot gases through the clearance space 44 which performs no useful work and thus results in turbine inefficiencies. In order to reduce the leakage of gases through the clearance, a pair of axially spaced annular labyrinth seals 46 are secured to the static shroud 42 and have portions which extend radially inwardly toward the rotating shroud 22. The use of labyrinth seals between the shrouds 42 and 22 effectively reduces, but does not eliminate, leakage through the shroud clearance space 44.

With reference now to FIGS. 2 and 3, the novelty of the present invention is the provision of a plurality of circumferentially spaced fluid passageways or ports 50 through the support housing 11 adjacent the static shroud 42. Each port 50 has one end 52 open to the relatively cool compressed air in the chamber 26 while the other end 54 of each port 50 is open to the shroud clearance space 44.

The ports 50 extend substantially axially through the support housing 11 and also angle radially inwardly from their first end 52 and to their second end 54. Consequently, while most of the compressed air expelled through the end 54 of the ports 50 enters the clearance space 44, a portion of the compressed air from the chamber 26 flows underneath and axially across the inner radial end of the rotating shroud 22 as indicated by arrow 56. The compressed air flows both over and under the rotating shroud 22 thus simply, but effectively, cools the rotating shroud 22 and increases the stress rupture life of the rotor and/or increases the maximum permissible turbine operating temperature.

As is best shown in FIG. 3, the ports 50 are also preferably tangentially angled in conformity with the inward air direction into the first turbine stage 16. The tangential angle of the ports 50 effectively minimizes undesirable air turbulence of the compressed air from the ports 50.

The ports 50 are of a number and dimension sufficient to create a cold air barrier in the clearance space 44 so that only cool air leakage through the clearance space 44 occurs. Thus, while the pressure energy loss through leakage through the clearance space 44 remains substantially the same as the previously known turbine engine constructions, the thermal energy loss through leakage is effectively eliminated by the present invention.

A further advantage of the shroud cooling means of the present invention is that the relatively cool air emitted through the ports 50 is more dense than the hot gases exhausting from the combustor and through the turbine nozzle. The dense cooler air thus will flow along the outer periphery of the turbine exhaust passageway and provide cooling for the rotating turbine shrouds downstream from the first turbine stage.

With reference now to FIGS. 2 and 4, additional or alternative compressed air ports 60 can be radially formed through the turbine static shroud 42. The radial ports 60 are circumferentially spaced around the static shroud 42 and are preferably open to the clearance spaced 44 inbetween the labyrinth seals 46. The compressed air flow from the chamber 26 and through the ports 60 also creates or helps to create a cold air barrier to eliminate hot gas leakage through the clearance space.

From the foregoing it can be seen that the present invention provides a novel shroud cooling means which additionally effectively prevents the leakage of hot gases through the shroud clearance space 44. Consequently, the previously known thermal energy loss caused by the leakage of hot gases through the clearance space is eliminated thereby increasing the overall turbine engine efficiency.

Having described my invention, however, many modifications thereto will become apparent to those skilled in the art to which it pertains without deviation from the spirit of the invention as defined by the scope of the appended claims.

I claim:

1. In a turbine engine of the type having a support housing, at least one turbine stage rotatably mounted in said housing and having an annular rotation shroud secured around its outer periphery, said turbine engine housing a compressor with a relatively cold compressed air outlet, said turbine engine further comprising a static shroud secured to said support housing coaxially around and spaced radially outwardly from said turbine shroud thereby defining a clearance space between said shrouds, the improvement which comprises:

means for cooling said shrouds and for simultaneously minimizing the leakage of hot gases through said clearance space, said means comprising a plurality of circumferentially spaced fluid ports, each fluid port having an inlet end open to said compressor outlet and an outlet end open to the upstream end of said clearance space, said fluid ports extending substantially axially through said support housing, said fluid ports being dimensioned to provide a compressed air flow toward said clearance space sufficient to create a cold air barrier in said clearance space and wherein said ports are angled with respect to the axis of rotation of said turbine stage in an amount and degree to minimize turbulence in the clearance space from the air flow through the ports.

2. The invention as defined in claim 1 wherein said ports angle radially inwardly toward said clearance space so that a portion of the air flow through said ports flows across the inner radial side of said rotating shroud.

3. The invention as defined in claim 1 wherein said turbine engine further comprises a pair of axially spaced annular labyrinth seals secured to the static shroud, each seal having a portion which extends radially inwardly toward the rotating shroud, said invention further comprising a plurality of circumferentially spaced radial ports formed through the static shroud, each radial port having one end open to the compressor outlet and its other end open inbetween the labyrinth seals.

4. The invention as defined in claim 1 wherein said ports are tangentially angled substantially in conformity with the direction of flow of the hot gases entering the turbine stage.

5. The invention as defined in claim 2 wherein said ports are tangentially angled substantially in conformity with the direction of flow of the hot gases entering the turbine stage.

* * * * *